(12) United States Patent
Kanasugi et al.

(10) Patent No.: US 6,717,386 B1
(45) Date of Patent: Apr. 6, 2004

(54) ELECTRIC POWER SUPPLY SYSTEM

(75) Inventors: Katsumi Kanasugi, Saitama (JP);
 Atsushi Kurauchi, Saitama (JP);
 Masaaki Hirose, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/577,010

(22) Filed: May 24, 2000

(30) Foreign Application Priority Data

May 25, 1999 (JP) .................................. P. 11-144284

(51) Int. Cl.[7] .............................. H02H 7/06; H02P 9/00; H02P 9/04
(52) U.S. Cl. ............................. 322/27; 322/24; 322/44
(58) Field of Search .............................. 322/44, 24–28; 363/124

(56) References Cited

U.S. PATENT DOCUMENTS

| 4,415,848 A | * | 11/1983 | Morishita ................. 322/32 |
| 4,827,393 A | * | 5/1989 | Clark ...................... 363/79 |
| 4,992,920 A | * | 2/1991 | Davis ...................... 322/32 |
| 5,061,889 A | * | 10/1991 | Iwatani et al. ............. 322/28 |
| 5,144,220 A | * | 9/1992 | Iwatani et al. ............. 322/28 |
| 5,177,677 A | * | 1/1993 | Nakata et al. .............. 363/89 |
| 5,233,286 A | * | 8/1993 | Rozman et al. .............. 322/90 |
| 5,352,971 A | * | 10/1994 | Nishimura ................. 322/27 |
| 5,406,471 A | * | 4/1995 | Yamanaka ................. 323/222 |
| 5,418,401 A | * | 5/1995 | Kaneyuki ................. 307/10.1 |
| 5,642,267 A | * | 6/1997 | Brkovic et al. ............. 363/16 |
| 5,675,237 A | * | 10/1997 | Iwatani .................... 322/28 |
| 5,710,699 A | * | 1/1998 | King et al. ............... 318/139 |
| 5,719,484 A | * | 2/1998 | Taniguchi et al. ............ 322/20 |
| 5,719,485 A | * | 2/1998 | Asada ...................... 322/28 |
| 5,793,167 A | * | 8/1998 | Liang et al. .............. 318/141 |
| 5,942,818 A | * | 8/1999 | Satoh et al. ............... 310/46 |
| 6,005,372 A | * | 12/1999 | Kouwa et al. ............... 322/25 |
| 6,175,217 B1 | * | 1/2001 | Da Ponte et al. ............ 322/19 |
| 6,229,289 B1 | * | 5/2001 | Piovaccari et al. ......... 323/268 |

* cited by examiner

*Primary Examiner*—Burton S. Mullins
*Assistant Examiner*—Julio C. Gonzalez
(74) *Attorney, Agent, or Firm*—Arent Fox Kintner Plotkin & Kahn PLLC (57) ABSTRACT

A rectifying section 2, and a DCDC converter 3 which lowers an input DC voltage and then outputs the voltage are disposed between an AC generator 1 and a load 4. When the output voltage Vt of the AC generator 1 is gradually lowered with starting from E0, the output power P is increased, and is maximum at Vt=V12. When the output voltage Vt is further lowered, the output power P is reduced. As an operating point at which the same output power P is obtained, there are a point of Vt=V11, and that of Vt=V13. The operation of the DCDC converter 3 is controlled so as to operate at the point of Vt=V13 where the output current I is lower.

9 Claims, 8 Drawing Sheets

ELECTRIC POWER SUPPLY SYSTEM

BACKGROUND OF THE INVENTION

1. Field of the Invention

The present invention relates to an electric power supply system which supplies a power generated by an AC generator to a load, and more particularly to a system which is suitably mounted on a vehicle to supply an electric power to a battery and other loads.

2. Description of the Related Art

Figure 8A:
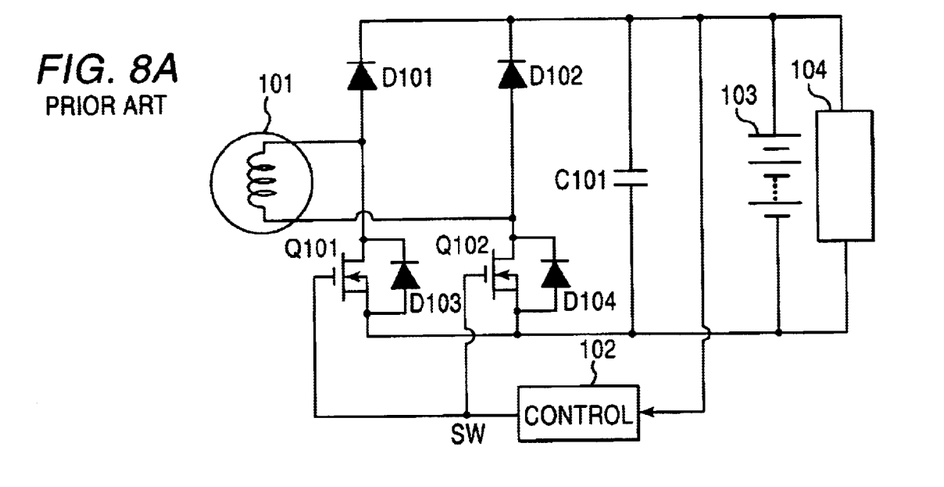
FIGS. 8A–C are a circuit diagram illustrating an example of a conventional art.

In a vehicle, particularly, in a motorcycle or the like, an electric power supply system which uses a synchronous generator and a short-circuit type regulator is employed from the viewpoints of miniaturization, cost reduction, and the like. As shown in FIG. 8A, for example, such a system includes: a synchronous generator 101; diodes D101 and D102 and a capacitor C101 which constitute a rectifying circuit; FETs (Field Effect Transistors) Q101 and Q102 and diodes D103 and D104 which constitute a switching circuit for performing a voltage control; a control section 102 which performs a switching control on the FETs; a battery 103; and an electrical load 104. The control section 102 monitors an output voltage VRCT of the rectifying circuit, and, when the output voltage exceeds a predetermined upper limit voltage VHL, outputs a switching signal SW which causes the FETs Q101 and Q102 to be turned on. In this configuration, when the FETs Q101 and Q102 are turned on, the circuit of FIG. 8A has a state in which the output terminals of the generator 101 are equivalently short-circuited as shown in FIG. 8B, thereby preventing the output voltage VRCT from rising above the upper limit voltage VHL.

Figure 9:
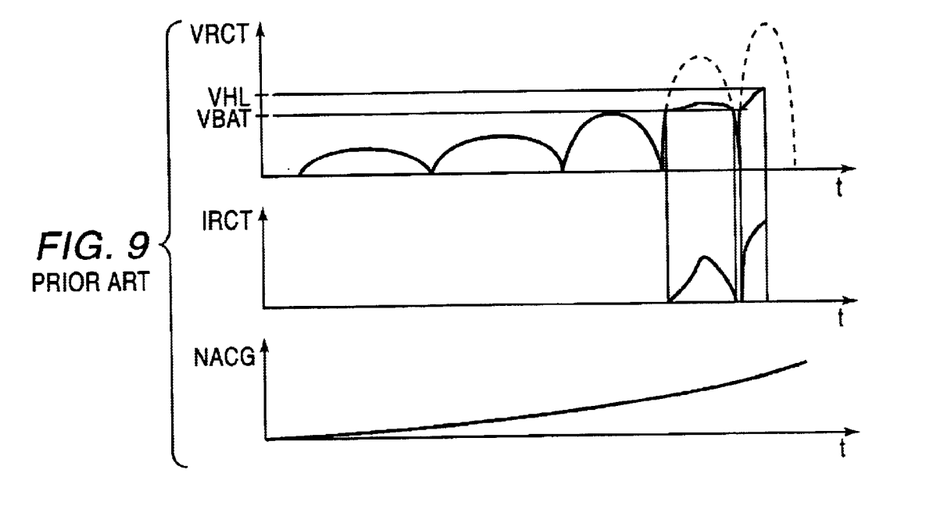
FIG. 9 is a time chart illustrating the operation of a circuit of FIG. 8.
Figure 10:
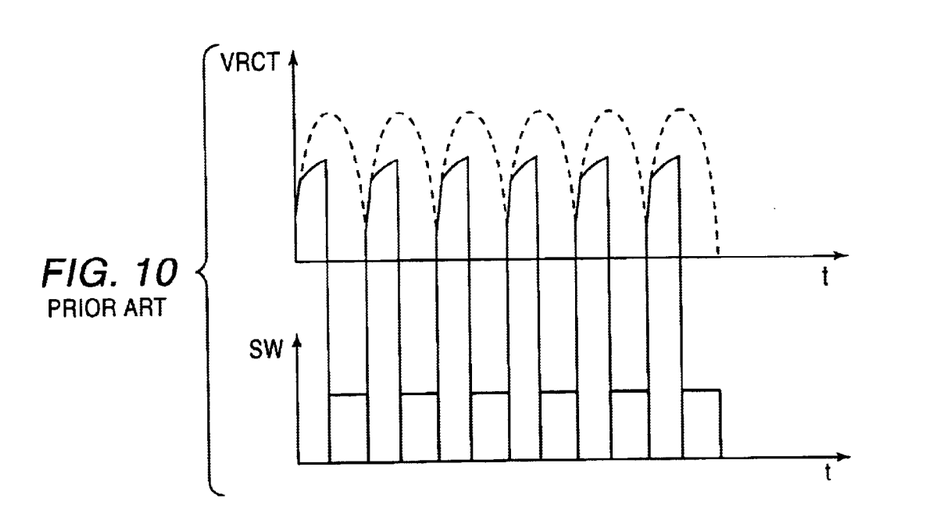
FIG. 10 is a time chart illustrating the operation of the circuit of FIG. 8.

FIGS. 9 and 10 are time charts illustrating the operation. In the figures, for the sake of convenience in description, changes of the voltage and the current in a state where the capacitor C101 is eliminated. As the rotational speed NACG (rpm) of the generator 101 is raised, the voltage VRCT is raised. When the output voltage reaches a voltage VBAT, charging of the battery 103 is started. When the output voltage VRCT is further raised to reach the upper limit voltage VHL, the FETs Q101 and Q102 are turned on and the output voltage VRCT becomes "0". When the number of revolutions of the generator reaches a usually used number so as to attain a stationary state, the voltage VRCT and the switching signal SW become as shown in FIG. 10. Actually, the output voltage VRCT of the rectifying circuit is maintained to a substantially constant level by the function of the capacitor C101 and the current output from the battery 103.

Figure 8B:
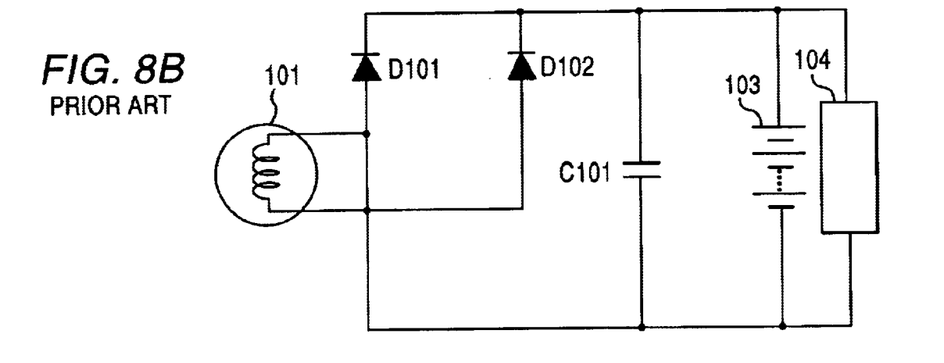
Figure 8C:
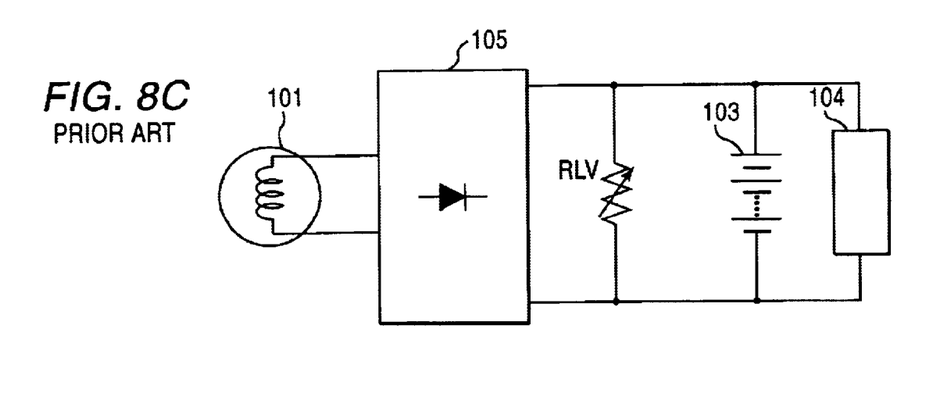

From a broad perspective, the above-mentioned operation seems to be equivalent to a situation in which the voltage VRCT is maintained to a constant level by controlling an average load resistance RLV which is connected to the output of the rectifying circuit 105 in parallel with the battery 103, and the like as shown in FIG. 8C.

In a conventional electric power supply system which uses a short-circuit type regulator such as shown in FIG. 8 and which is employed in a motorcycle or the like, the output characteristic at the idling rotation of an engine which drives the generator 101 may be set to the charging voltage VBAT which is necessary for charging the battery 103. In this case, when the engine rotates at a high number of revolutions, a power which is larger than that required for charging the battery 103 is generated, and the output voltage Vt of the generator 101 exceeds the upper limit voltage VHL. When the voltage is raised, therefore, the output terminals are short-circuited, whereby the average load resistance RLV is lowered so that the output voltage of the rectifying circuit is maintained to a level which is slightly higher than the charging voltage VBAT. In other words, when the output voltage Vt is raised, the output terminals are short-circuited to equivalently lower the load resistance, and an unwanted power is dissipated, thereby maintaining the voltage to a constant level.

Figure 11:
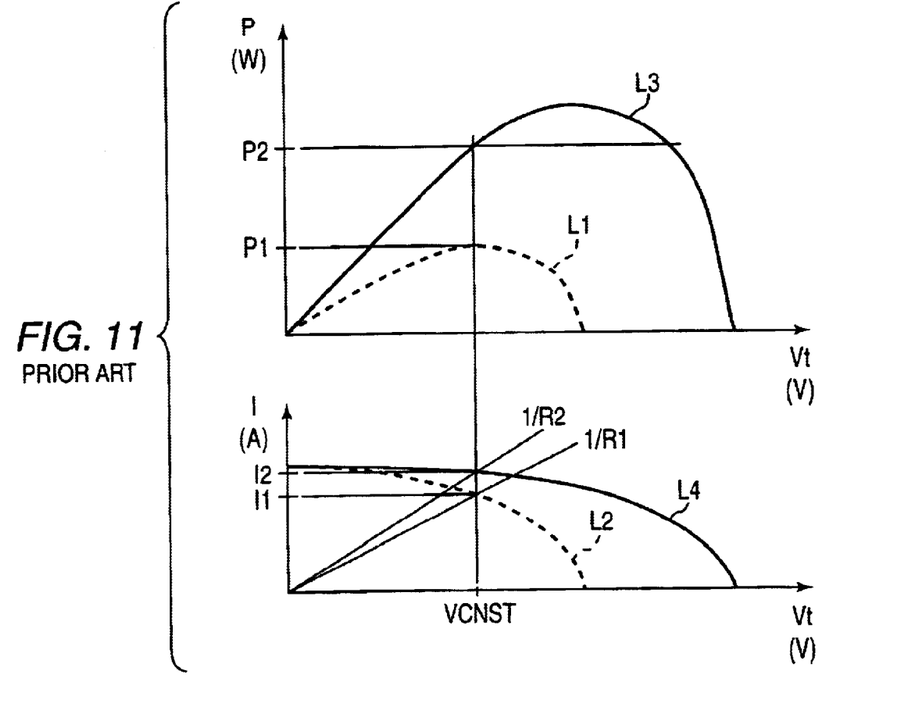
FIG. 11 is a view showing the operation characteristic of an AC generator.

FIG. 11 is a characteristic diagram which shows variations of the output power P and the output current I and in which the abscissa indicates the output voltage Vt of the generator 101. The broken lines L1 and L2 correspond to characteristics during idling of the engine (at the rotational speed NACG=f1), and the solid line L3 and L4 correspond to characteristics at a high number of revolutions (at NACG=f2>f1). The conventional voltage controlling technique described above corresponds to the case where, at a low number of revolutions, RLV=R1 is set and the operating point (I=I1, Vt=VCNST) is at an intersection of the straight line of an inclination of 1/R1 and the broken line L2, and, at a high number of revolutions, RLV=R2 is set and the operating point is moved to an intersection (I=I2, Vt=VCNST) of the straight line of an inclination of 1/R2 (>1/R1) and the solid line L4. In the conventional controlling technique, therefore, the voltage can be maintained to a constant level, but a heat loss occurs as a result of the short circuiting and hence the generator wastefully generates a power, thereby causing a problem in that energy is largely lost.

SUMMARY OF THE INVENTION

The invention has been conducted in view of the problem. It is an object of the invention to provide an electric power supply system in which the operating point of an AC generator can be appropriately controlled and the energy loss can be suppressed to a minimum level.

In order to attain the object, according to a first aspect of the invention, in electric power supply system for supplying a power generated by an AC generator to a load, the system comprises controlling means, disposed between the load and the AC generator, for performing a control so that the AC generator operates in a current range which is lower in level than an output current corresponding to a maximum power operating point of the AC generator.

In this configuration, the AC generator is controlled so as to operate in a current range which is lower than an output current corresponding to the maximum power operating point of the AC generator. Therefore, the energy loss due to the internal resistance of the AC generator can be suppressed to a minimum level, with the result that an electric power supply system of a high efficiency can be realized.

According to a second aspect of the invention, in the power supply system of the first aspect of the invention, the AC generator has a drooping characteristic in which, as the load is increased, an output voltage is lowered and an output power is increased, the output power is maximum at the maximum power operating point, and, when the output voltage is further lowered, the output power is reduced, and the controlling means performs, a control so that a load resistance of the AC generator starts from an initial state in which the load resistance is substantially infinite, and is reduced with a passage of time.

In this configuration, the load resistance of the AC generator having a drooping characteristic is controlled in such a manner that the load resistance starts from an initial state in which the value is substantially infinite, and is then reduced with the passage of time. Therefore, an operation of the AC generator at a desired operating point can be surely realized by a relatively simple control.

According to a third aspect of the invention, in the power supply system of the first or second aspect of the invention, the controlling means has rectifying means for rectifying an output of the AC generator, and DC voltage converting means for lowering an output voltage of the rectifying means and then supplying the output voltage to the load, and performs a feedback control so that an output voltage of the DC voltage converting means coincides with a target voltage.

In this configuration, the output of the AC generator is rectified, and feedback controlled so that the DC voltage applied to the load coincides with a target voltage. Therefore, the energy loss of the AC generator can be suppressed to a minimum level, and, even when the output of the AC generator is varied, a stabled DC voltage can be always supplied.

DETAILED DESCRIPTION OF THE PREFERRED EMBODIMENT

Hereinafter, an embodiment of the invention will be described with reference to the accompanying drawings.

Figure 1:
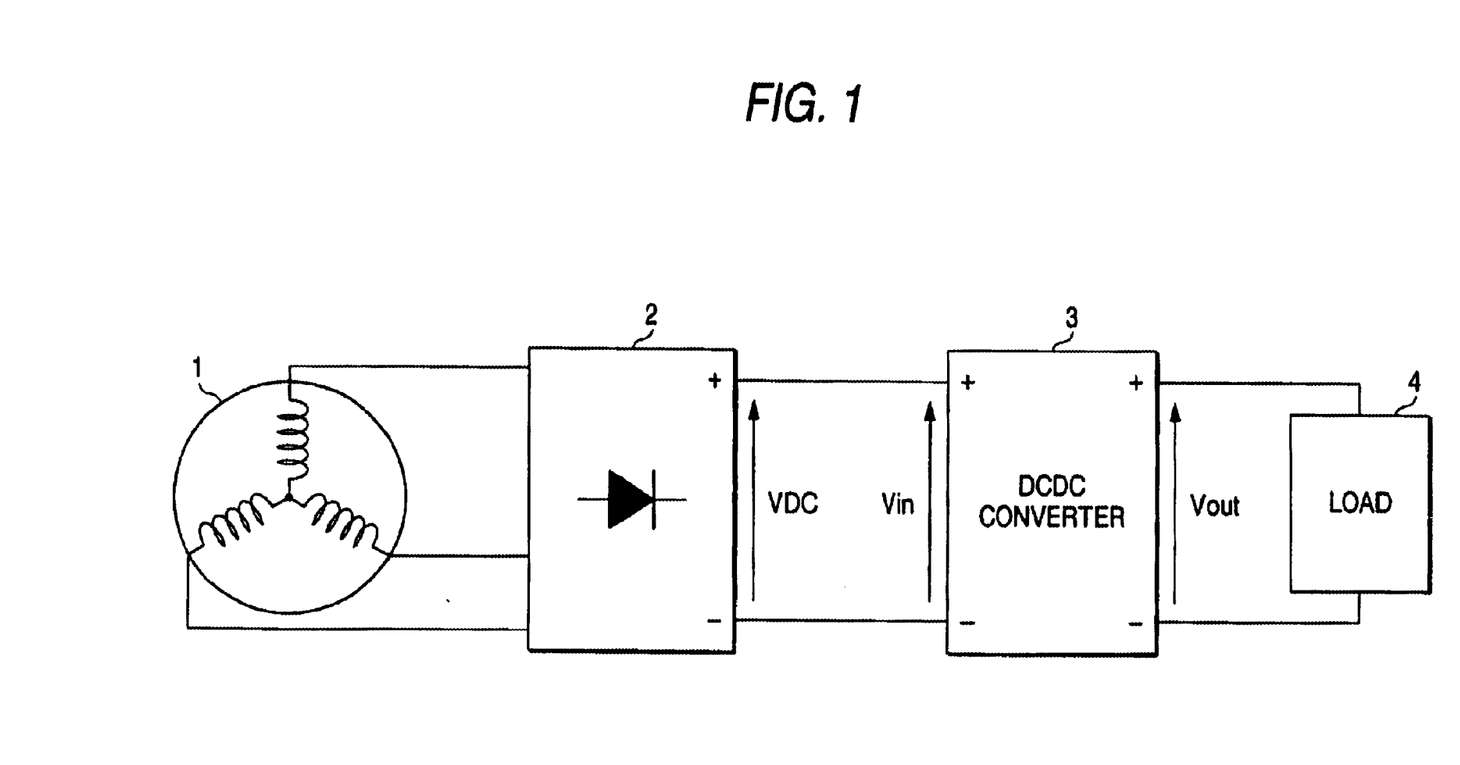
FIG. 1 is a block diagram showing the configuration of a power supply system which is an embodiment of the invention.

FIG. 1 is a diagram showing the configuration of an electric power supply system for a vehicle which is an embodiment of the invention. The system is configured by: a synchronous AC generator (hereinafter, abbreviated to "ACG") 1 which is rotatively driven by an engine (not shown) of the vehicle; a rectifying section 2 which rectifies the output of the ACG 1 to output a DC voltage VDC; and a DCDC converter 3 which receives the output voltage VDC of the rectifying section 2, as an input voltage Vin, which lowers the input voltage Vin to output an output voltage Vout (<Vin), and which supplies the output voltage to a load 4 including a battery.

Figure 2:
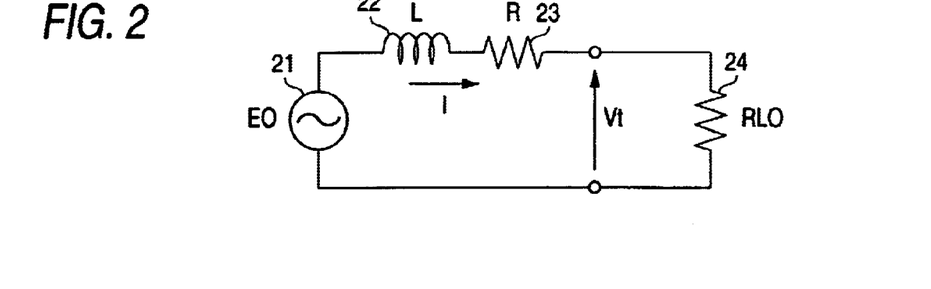
FIG. 2 is a circuit diagram showing an equivalent circuit of an AC generator.

FIG. 2 is an equivalent circuit diagram of the ACG 1. The ACG 1 can be deemed to be configured by a voltage source 21 which outputs an AC voltage of an effective voltage E0, a coil 22 of an inductance L, and a resistor 23 of a resistance R. The operation in the case where a load resistor 24 of a resistance RL0 is connected to the ACG will be described.

The induced electromotive force E0 is given by following expression (1).

$$E0 = \sqrt{2}\pi k f \Phi \qquad (1)$$

where k is the number of series conductors, f is the rotational speed, and $\Phi$ is the magnetic flux.

The output voltage Vt and the output current I are respectively given by following expressions (2) and (3):

$$Vt = E0 - ZI \qquad (2)$$

$$I = E0/(RL0 + Z) \qquad (3)$$

where $Z = R + j\omega L$.

Therefore, the output power P is given by following expression (4).

$$P = Vt \times I = \frac{RLO}{(RLO + Z)^2} E0^2 \qquad (4)$$

Figure 3A:
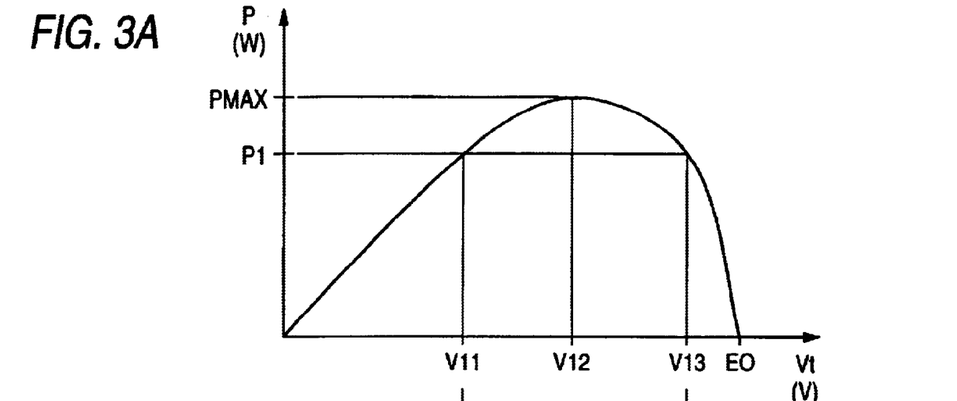
FIGS. 3A–C are a view showing the operation characteristic of the AC generator.
Figure 3B:
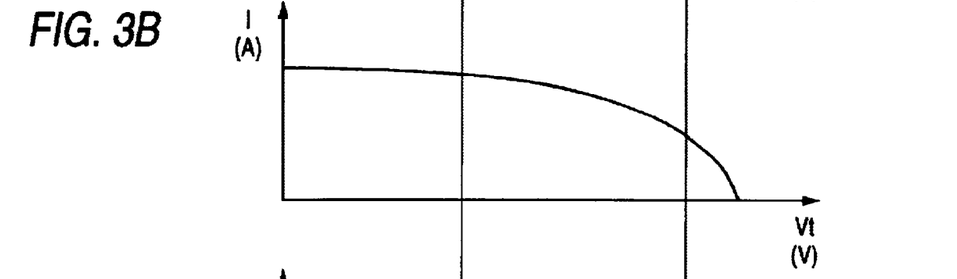
Figure 3C:
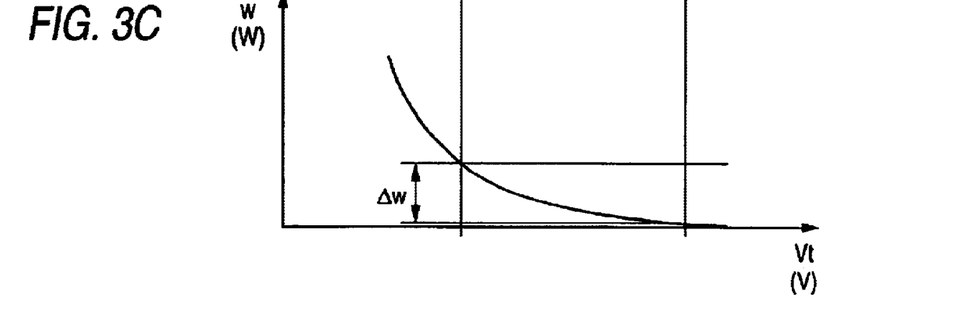

When the load resistance RL0 is varied from 0 to infinity, the output voltage Vt is changed from 0 to E0, and the output power P and the output current I are changed with respect to the change of the output voltage Vt as shown in FIGS. 3A and 3B. In other words, the output power P shows a drooping characteristic in which, when the output voltage Vt corresponding to the load is lowered from E0, the output power P is increased, the output power has the maximum value PMAX when the output voltage Vt=V12, and, when the output voltage Vt is further lowered (when the load resistance RL0 is further lowered), the output power is reduced.

As the operating point where a certain power P1 which is smaller than the maximum value PMAX is output, therefore, two points, or a point of Vt=V11, and that of Vt=V13 exist.

FIG. 8C shows the loss due to the internal resistance 23, i.e., the copper loss w ($=I^2R$). At the operating point in which Vt=V13 and the output current I is lower, the copper loss w is smaller by $\Delta w$. In other words, assuming that the number of revolutions f and the other losses (such as the iron loss and the mechanical loss) in the ACG 1 are identical, the efficiency when the ACG operates at the operating point of the higher voltage (Vt=V13) is higher. In the embodiment, therefore, a control technique which will be described below is performed so that the operating point of the ACG 1 is in a range which is higher in voltage than the operating point (Vt=V12) where the output power P is maximum, i.e., in a range in which the output current I is lower, thereby realizing a highly efficient electric power supply system. As seen from FIG. 3A, in the range of Vt>V12, a positive power characteristic in which the output power P is increased as the load resistance RL is lower (the output voltage Vt is lower), or as the load is larger is attained. The characteristic is favorable also in this point.

As apparent from the characteristic of FIG. 3A, when the load resistance RL0 is reduced from infinity (opened), the operating point of the ACG 1 can be gradually transferred from the point of Vt=E0 to that of, Vt=V13. Therefore, the operation of the ACG 1 in the above-mentioned range of Vt>V12 can be easily realized by, for example, performing a control so that the load resistance of the ACG 1 is equivalently infinite at the start of the control of the ACG 1.

Figure 4:
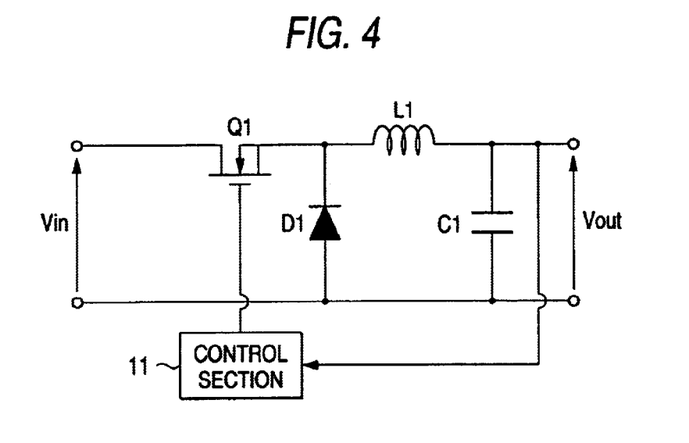
FIG. 4 is a circuit diagram showing the configuration of a DCDC converter.

As shown in FIG. 4, the DCDC converter 3 comprises: a field effect transistor (FET) Q1 which performs a switching operation; a shunt diode D1; a low-pass filter configured by a coil L1 and a capacitor C1; and a control section 11 which controls the switching of the FET Q1 in accordance with the output voltage Vout, and which performs a feedback control so that the output voltage Vout is substantially constant. The control on the FET Q1 by the control section 11 is performed by means of a PWM (Pulse Width Modulation) control. The period of a signal for the PWM control is indicated by τ, and the on time when the FET Q1 is turned on is indicated by Ton. When the frequency of the PWM control signal is sufficiently higher than the cut-off frequency of the low-pass filter configured by the coil L1 and the capacitor C1 (the period τ is sufficiently short), the output voltage Vout is given by following expression (5)

$$Vout = Vin \times Ton/\tau \quad (5)$$

When the output current supplied to the load 4 is indicated by Iout, expression (5) can be modified into following expression (6).

$$Vout = \frac{(Vin \cdot Ton)^2}{Vin \cdot Ton^2 + 2 Iout \cdot L \cdot \tau} \quad (6)$$

where L is the inductance of the coil L1.

Even when the input voltage Vin or the output current Iout is varied, therefore, the output voltage Vout can be maintained to a constant value by changing the on time Ton.

The output current Iout can be expressed by following expression (7) which is obtained by modifying expression (6). As apparent from expression (7), when the output voltage Vout is controlled so to be constant, the output current Iout is proportional to the square of the on time Ton.

$$Iout = \frac{Ton^2}{2L \cdot \tau} \left( \frac{Vin^2}{Vout} - Vin \right) \quad (7)$$

When the equivalent resistance of the load 4 is indicated by RL, RL is expressed by RL=Vout/Iout, and Iout=Vout/RL. When this is applied to expression (7), the resistance RL is given by following expression (8).

$$RL = \frac{2L \cdot \tau}{Ton^2} \left( \frac{Vout^2}{Vin^2 - Vin \cdot Vout} \right) \quad (8)$$

From this expression, it will be seen that, when the input voltage Vin and the output voltage Vout are constant, the load resistance RL is proportional to the square of the reciprocal of the on time Ton. In other words, when the load resistance RL is lowered, the value of the expression (Vout$^2$/(Vin$^2$–Vin×Vout) in the parentheses of the right side can be made constant by prolonging the on time Ton, so that the output voltage Vout is constant.

Figure 5:
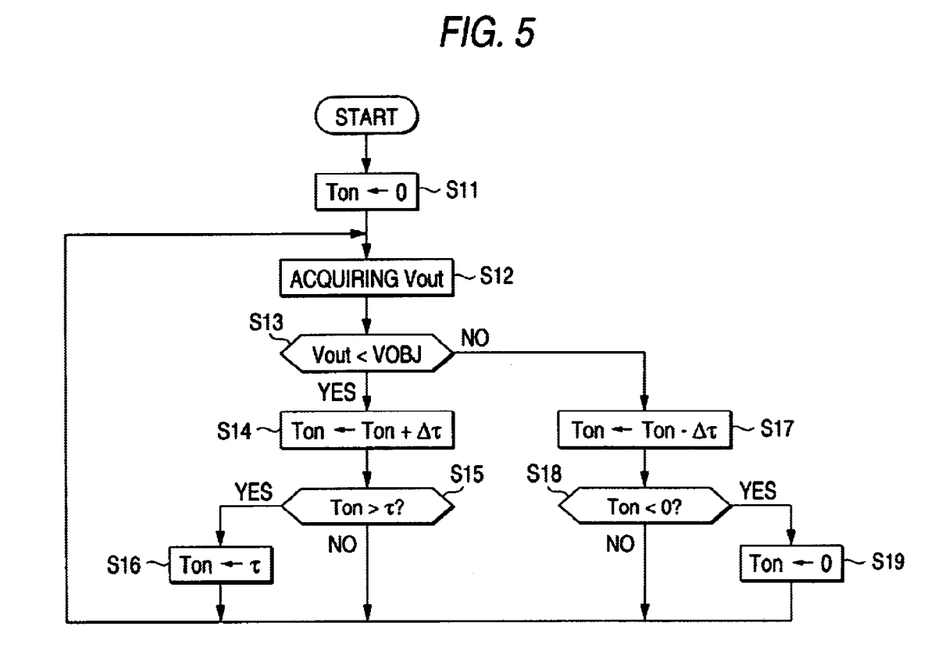
FIG. 5 is a flowchart showing a control procedure in a control section of FIG. 4.

FIG. 5 is a flowchart showing the process of controlling the on time Ton in the control section 11. In the process, as described above, a control is performed so that the equivalent load resistance of the ACG 1 is made substantially infinite, and then reduced with the passage of time, and the output voltage Vout of the DCDC converter 3 is maintained to a target voltage VOBJ.

When the ACG 1 starts to operate, first, the on time Ton is set to "0" (step S11). When Ton=0, the FET Q1 is completely free from turning on, and hence the equivalent resistance as seen from the ACG 1 is substantially infinite (opened). Thereafter, the output voltage Vout is acquired (step S12), and it is judged whether the output voltage Vout is lower than the target voltage VOBJ (for example, 13 V) or not (step S13). For example, the target voltage VOBJ is set to, when the output voltage Vt of the ACG 1 is at a middle point between the voltages V12 and E0, a value which is equal to the output voltage Vout in the case where the on time Ton is about τ/2.

Initially, Vout<VOBJ is obtained in step S13. Therefore, the on time Ton is incremented by a unit time Δτ (step S14), and it is then judged whether the on time Ton is longer than the period τ of the PWM control signal or not (step S15). Initially, Ton=Δτ, and hence the control is immediately returned to step S12. For example, the unit time Δτ is set to be equal to a minimum unit time in the case where the on time Ton is changed. Specifically, when the on time Ton can be changed in an n number of steps including 0, Δτ is set to Δτ=τ/(n−1).

As the on time Ton is further prolonged, the output voltage Vout is raised, and Vout>VOBJ is then obtained in step S13. The control then proceeds to step S17 to decrement the on time Ton by the unit time Δτ. Thereafter, it is judged whether the value of the on time Ton is negative or not (step S18). Usually, Ton>0, and hence the control is immediately returned to step S12.

In this way, when the output voltage Vout is lower than the target voltage VOBJ, the on time Ton is prolonged, and, when the output voltage Vout is higher than the target voltage VOBJ, the on time Ton is shortened, whereby the output voltage Vout is maintained to the target voltage VOBJ. If Ton>τ is obtained in step S15, Ton=τ is set (step S16) because the on time Ton cannot exceed the period τ of the PWM control signal, and the control then returns to step S12. If Ton<0 is obtained in step S18, Ton=0 is set (step S19), and the control then returns to step S12.

In the process of FIG. 5, when the ACG 1 starts to operate, the on time Ton is gradually prolonged with starting from 0. Therefore, the load resistance of the ACG 1 is gradually lowered from the state where it is substantially infinite. As a result, the operating point of the ACG 1 can be moved in the lowering direction of the output voltage Vt from the state of Vt=E0 in FIG. 3, and the operation in the range of Vt>V12 can be easily realized. Consequently, the efficiency of the ACG 1 can be made higher than that in the conventional art, and the wasteful use of energy can be suppressed to a minimum level.

Figure 6:
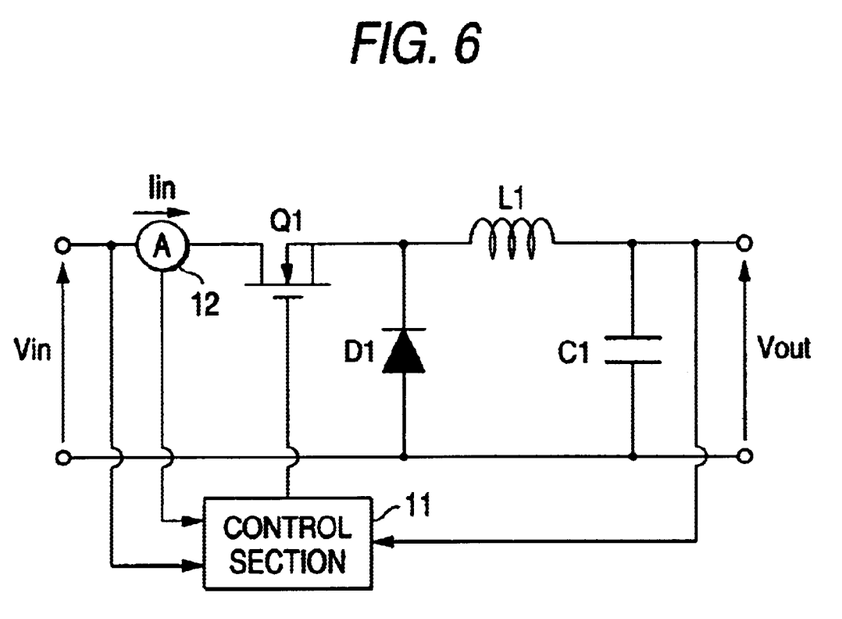
FIG. 6 is a diagram showing a modification of the configuration of FIG. 4.

FIG. 6 shows a modification of the configuration of FIG. 4. A current sensor 12 which detects the input current Iin is disposed. In addition to the output voltage Vout, the input voltage Vin and the input current Iin are supplied to the control section 11. In the configuration of FIG. 4 and the corresponding control of FIG. 5, when the rotation of the ACG 1 is accidentally varied at a period which is longer than the control period, there is a possibility that the operating point of the ACG 1 may be moved into a range (Vt<V12) which is lower than the maximum power operating point (Vt=V12). In the modification, therefore, a control in which, when such a situation occurs, the operating point is returned to the higher voltage range (Vt>V12) is additionally performed.

Figure 7:
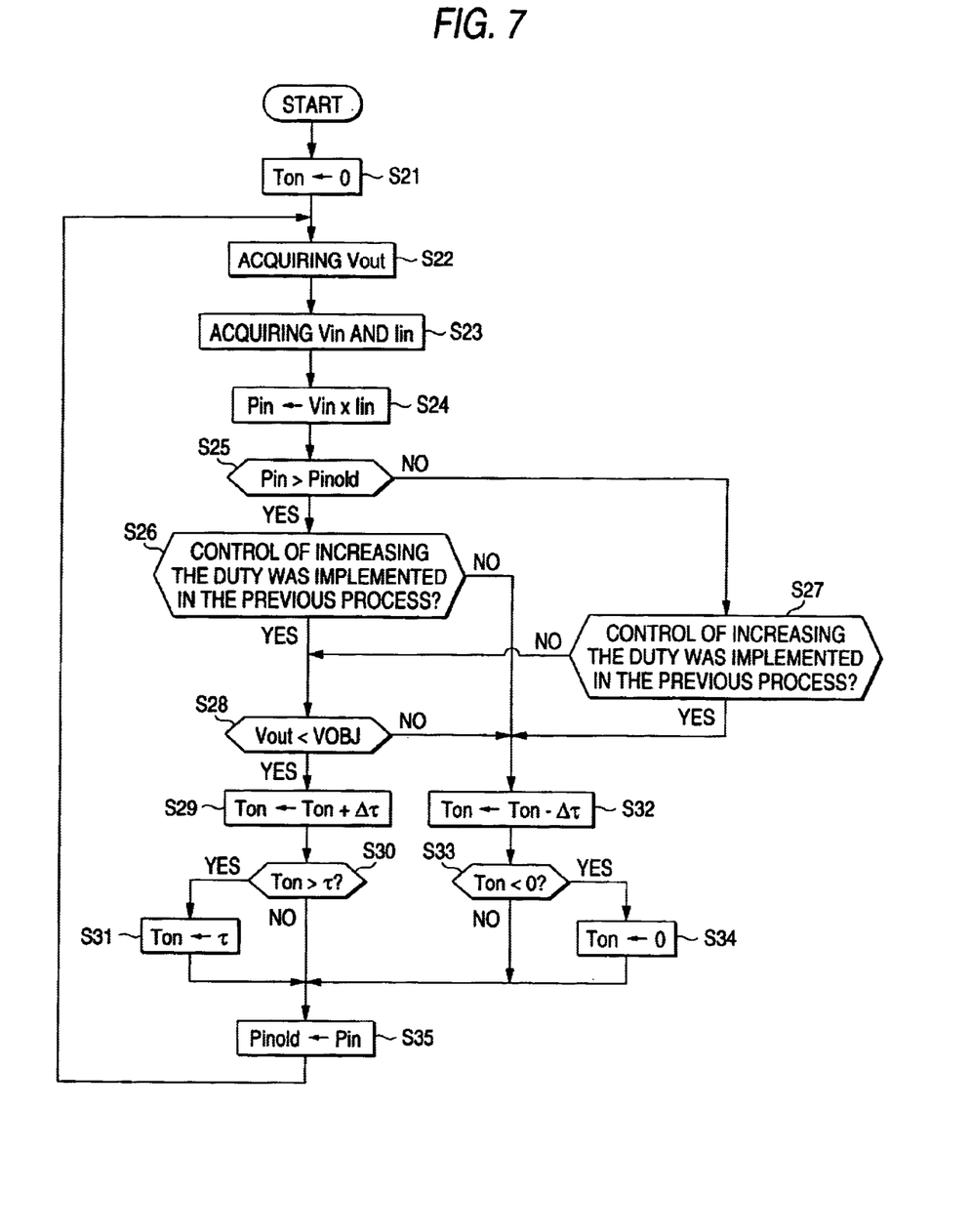
FIG. 7 is a flowchart showing a control procedure in a control section of FIG. 6.

FIG. 7 is a flowchart showing the control procedure which is implemented by the control section 11 in the case where the configuration of FIG. 6 is employed. In the flowchart, steps S21, S22, and S28 to S34 are identical with steps S11, S12, and S13 to S19 of FIG. 5. Namely, the process of FIG. 7 is configured by adding the process of steps S23 to S27 to that of FIG. 5.

In step S23, the input voltage Vin and the input current Iin are acquired. The input voltage and the input current are multiplied with each other to calculate the input power Pin (step S25). Then, it is judged whether the input power Pin is larger than the previous value Pinold or not (step S25). If Pin>Pinold, it is judged whether a control of increasing the duty was implemented in the previous process or not, or whether step S29 in which the on time Ton is incremented was performed or not (step S26). If the judgment result is affirmative (YES), the control proceeds to step S28 to implement the feedback control corresponding to the output voltage Vout in the same manner as FIG. 5 (steps S28 to S34), the current value Pin of the input power is set to the previous value Pinold (step 535), and the control then returns to step S22.

By contrast, if the judgment result in step S26 is negative (NO), or if the input power Pin is increased and a control of increasing the duty was not implemented in the previous process, this shows that the operating point of the ACG 1 has been moved into the range which is lower than Vt=V12. Therefore, the control proceeds to step S32 to perform a control of decrementing the on time Ton, i.e., a control of returning the operating point of the ACG 1 to the higher voltage range.

If the judgment result in step S25 shows Pin≦Pinold, the same judgment as that of step S26 is performed (step S27). If the judgment result is negative (NO), the control proceeds to step S28 to implement the feedback control corresponding to the output voltage Vout. By contrast, if the judgment result in step S27 is affirmative (YES), or if the input power Pin is reduced and a control of increasing the duty was implemented in the previous process, this shows that the operating point of the ACG 1 has been moved into the lower voltage range. Therefore, the control proceeds to step S32 to perform a control of decrementing the on time Ton, i.e., the control of returning the operating point of the ACG 1 to the higher voltage range.

As described above, in the process of FIG. 7, in the case where the operating point, of the ACG 1 has been moved into the lower voltage range (Vt<V12), the control of returning the operating point to the higher voltage range (Vt>V12) is implemented. Therefore, the ACG 1 can always operate at an operating point of a higher efficiency, so that the efficiency of the whole system can be satisfactorily maintained.

In the above-described embodiment, the rectifying section 2 and the DCDC converter 3 constitute the controlling means, the rectifying section 2 corresponds to the rectifying means, and the DCDC converter 3 corresponds to the DC voltage converting means.

The invention is not restricted to the above-described embodiment and may be variously modified. In the above-described embodiment, as the feedback control of the output voltage Vout, the technique is employed in which, in accordance with the level relationship between the detected output voltage Vout and the target voltage VOBJ, the on time Ton is incremented or decremented by a constant time Δτ. Alternatively, for example, another technique of making a detected value coincident with a target value, such as a PID control which is performed according to a deviation between the output voltage Vout and the target voltage VOBJ may be employed.

As described above in detail, according to the, first aspect of the invention, the AC generator is controlled so as to operate in a current range which is lower than an output current corresponding to the maximum power operating point of the AC generator. Therefore, the energy loss due to the internal resistance of the AC generator can be suppressed to a minimum level, with the result that an electric power supply system of a high efficiency can be realized.

According to the second aspect of the invention, the load resistance of the AC generator having a drooping characteristic is controlled in such a manner that the load resistance starts from an initial state in which the value is substantially infinite, and is then reduced with the passage of time. Therefore, an operation of the AC generator at a desired operating point can be surely realized by a relatively simple control.

According to the third aspect of the invention, the output of the AC generator is rectified, and feedback controlled so that the DC voltage applied to the load coincides with a target voltage. Therefore, the energy loss of the AC generator can be suppressed to a minimum level, and, even when the output of the AC generator is varied, a stabled DC voltage can be always supplied.

What is claimed is:

1. An electric power supply system comprising;
   an AC generator for generating a power to supply the power to a load; and
   controlling means for controlling said AC generator so that said AC generator operates in a current range where an output current is lower than a maximum power output current corresponding to a maximum power operating point of said AC generator;
   wherein said AC generator has an operating characteristic in which, an output power increases as an output voltage decreases until said output power is maximum at said maximum power operating point, and said output power decreases as said output voltage further decreases;
   wherein said controlling means performs a control so that a load resistance of said AC generator starts from an initial state, in which the load resistance is substantially equivalent to an open circuit load resistance, and thereafter the load resistance is reduced over time.

2. The electric power supply system according to claim 1, wherein said controlling means comprises:
   rectifying means for rectifying an output of said AC generator; and
   DC voltage converting means for lowering an output voltage of said rectifying means and supplying said output voltage to said load, and for performing a feedback control so that an output voltage of said DC voltage converting means coincides with a target voltage.

3. The electric power supply system according to claim 1, wherein said controlling means comprises:
   rectifying means for rectifying an output of said AC generator; and
   DC voltage converting means for lowering an output voltage of said rectifying means and supplying said output voltage to said load, and for performing a feedback control so that an output voltage of said voltage converting means coincides with a target voltage.

4. The electric power supply system according to claim 1, wherein said controlling means comprises:
   rectifying means for rectifying an output of said AC generator; and
   DC voltage converting means for lowering an output voltage of said rectifying means and supplying said output voltage to said load, and for performing a feedback control so that an output voltage of said voltage converting means coincides with a target voltage.

5. The electric power supply system according to claim 1, wherein said load includes a battery.

6. The electric power supply system according to claim 2, wherein said DC voltage converting means is DCDC converter.

7. The electric power supply system according to claim 2, wherein said DC voltage converting means comprises:
 a switching element for performing a switching operation; and,
 a control section for controlling a switching of said switching element according to said output voltage.

8. The electric power supply system according to claim 6, wherein said DC voltage converting means comprises at least one of sensor for detecting an input current and said input current is supplied to said control section.

9. The electric power supply system according to claim 7, wherein said control section controls said switching element by means of a pulse width modulation control.

* * * * *